Jan. 22, 1952  J. F. GOLDEN  2,582,983
PRECISION TOOLHOLDER
Filed Oct. 6, 1947
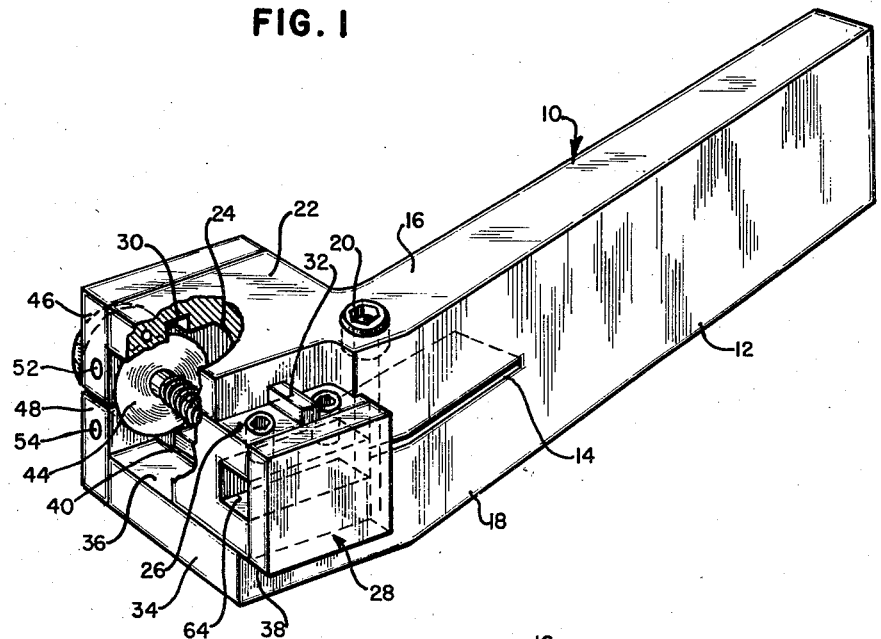
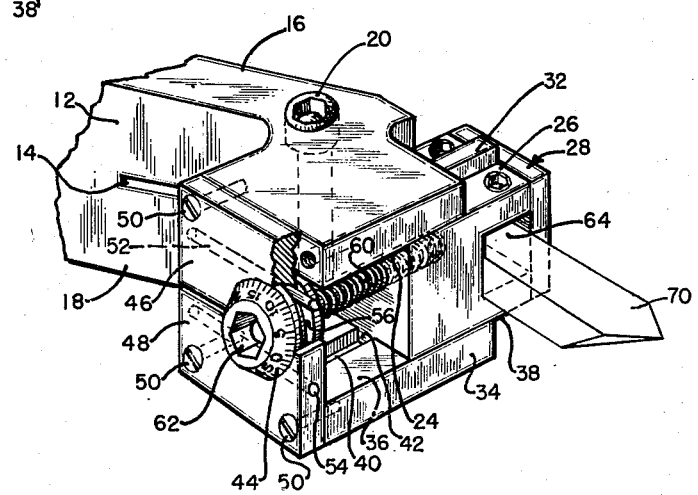
INVENTOR.
JOHN F. GOLDEN
BY
ATTORNEY Patented Jan. 22, 1952

2,582,983

UNITED STATES PATENT OFFICE 2,582,983
PRECISION TOOLHOLDER
John F. Golden, Lynn, Mass.
Application October 6, 1947, Serial No. 778,152
7 Claims. (Cl. 29—96)
(Granted under the act of March 3, 1883, as amended April 30, 1928; 370 O. G. 757)

This invention relates to lathe tool holders, and more particularly to a lathe tool holder that will facilitate special operations, such as cutting multiple threads on an engine lathe or on a turret lathe.

The procedure of cutting a single thread on either an engine lathe or on a turret lathe is relatively simple once the lathe has been set up for the desired pitch of the screw thread. By a relatively simple procedure is meant a procedure by which rapid mass production of the item may be obtained by a semi-skilled worker. Of the two types of lathes mentioned above, the turret lathe is generally best suited to mass production techniques.

It frequently happens that, instead of a single screw thread, a multiple screw thread must be machined. It is well known that, with conventional lathe cutting tools, it is virtually impossible to cut multiple threads on certain types of turret lathes. It is also well known that, while multiple threads may be cut on most engine lathes, the procedure to be followed is beyond the skill of the average semi-skilled workman.

Accordingly, the present invention contemplates and has as a primary object the provision of a novel lathe tool adaptable to the performance of numerous special machining operations.

It is another object of the present invention to provide a simple, novel tool holder that will permit the cutting of multiple threads on turret lathes that will cut single threads.

It is a further object of this invention to provide a tool holder adapted to receive conventional cutting tools that will materially reduce the difficulty encountered in machining multiple threads.

A further object of this invention is to provide a holder for conventional thread tools that will permit semi-skilled workers to machine multiple threads on a mass production basis.

Another object of this invention is to provide means for machining multiple threads with greater accuracy than was heretofore possible with conventional tools.

Still another object of the present invention is to provide means for making a series of cuts that are accurately spaced along the axis of the work.

Still other objects, features and advantages of the present invention will become apparent from the following description, which is to be read in connection with the accompanying drawing, wherein:

Fig. 1 is a broken perspective view of a preferred embodiment of the tool holder of the present invention; and Fig. 2 is a fragmentary perspective view of the embodiment shown in Fig. 1. In Fig. 2 that portion of the tool holder shown has been rotated in a horizontal plane by approximately 120° from the position shown in Fig. 1.

Referring now more particularly to Figs. 1 and 2 of the drawing, there is shown a tool holder 10 having a shank 12 adapted to be clamped in the conventional tool post provided on the cross slide of a lathe. Shank 12 is bifurcated; that is, it is divided by a slot 14 into an upper portion 16 and a lower portion 18 at its left hand end, as shown in Fig. 1. A hole is formed in portion 16 to receive a machine screw 20. This hole is of sufficient diameter to provide a sliding fit for the body of the screw but is small enough to prevent the head of screw 20 from passing therethrough. If desired, the hole may be counterbored so that the top of screw 20 is approximately flush with the upper surface of shank 12. A socket is provided in the head of screw 20 to receive an Allen wrench or similar tool. An aligned threaded opening is provided in portion 18 for engagement of the lower end of screw 20. Integral with and extending from portion 16 is side extension 22 of shank 12 that is provided with a machined face 24 which embraces the upper face 26 of a tool supporting element 28. A keyway 30 is milled or otherwise formed in face 24 to receive a key 32 formed integral with or rigidly affixed to tool supporting element 28.

In a similar manner, a side extension 34 of shank 12 extending from lower portion 18 is provided with a machined face 36 which embraces the lower face 38 of tool supporting element 28. A keyway 40 parallel to keyway 30 is also provided in face 36 to receive a key 42 formed on or secured to face 38 of tool supporting element 28.

Portions 22 and 34 of shank 12 form guide portions which allow tool supporting element 28 to move only in a direction parallel to keyways 30 and 40. Screw 20 provides means for drawing faces 24 and 36 closer together so that they may frictionally engage faces 26 and 38 of tool supporting element 28 thus preventing any movement of element 28 with respect to shank 12 when screw 20 is tightened. Screw 20 thus acts and will be hereinafter referred to as a clamping screw. The action of clamping screw 20 is opposed by the elasticity of the material from which shank 12 is formed so that, as screw 20 is loosened, the friction between faces 24 and 26 and 36 and 38 respectively is reduced sufficiently to allow element 28 to slide between members 22 and 34.

A dial cylinder 44 is supported between two plates 46 and 48, which are, in turn, rigidly attached to portions 22 and 34, respectively, by screws 50. Plates 46 and 48 are spaced apart sufficiently to prevent any interference with the clamping action of screw 20. Dial cylinder 44 is free to rotate within the openings provided in plates 46 and 48, but axial movement of cylinder 44 is prevented by pins 52 and 54 which engage a circumferential groove 56 in cylinder 44. Pins 52 and 54 are supported by being pressed into holes formed in plates 46 and 48, respectively. A threaded shank 60 extends axially from cylinder 44 and engages tool supporting element 28 in a correspondingly threaded hole formed therein.

Screw 60 and dial cylinder 44 provide means for displacing tool supporting element 28 in a predetermined manner. To facilitate adjustment of element 28, dial cylinder 44 is provided with graduations and plate 46 with an index mark. The spacing between graduations on cylinder 44 may be any arbitrarily assigned values, but preferably they are selected to indicate the travel of element 28 in inches or millimeters. The left hand end of dial cylinder 44, as shown in Fig. 2, is provided with a hexagonal socket 62. An Allen wrench or similar tool may be inserted in socket 62 to rotate screw 60 when clamping screw 20 is loose or has been tightened to a semi-clamped position. The left-hand end of element 28, as this element is shown in Fig. 1, is provided with a rectangular opening 64 of such size that standard lathe tool bits may be easily inserted therein. In the embodiment of the invention shown in the drawing, element 28 is formed of two sections. Opening 64 is first formed as a groove in the larger portion as illustrated and plate 66 is then brazed, welded, or otherwise secured thereto. It is obvious that element 28 may be formed equally well from a single piece of metal and opening 64 formed therein in any manner.

Threaded openings for set screws 68 extend from face 26 and communicate with opening 64. Set screws 68 are inserted in these threaded openings and provide means for clamping the tool bit within opening 64. Fig. 2 clearly shows a tool bit 70 clamped in opening 64 in the manner described above.

The tool holder described above is employed in the following manner. The lathe in which the work is placed is set to cut a thread of the desired lead. Tool 70 is clamped in element 28 in the manner described above and shank 12 is clamped in the tool post of the lathe. The position of shank 12 should be such that keyways 30 and 40 are substantially parallel to the axis of the work.

Element 28 is placed in a known position, and screw 20 tightened to prevent movement thereof relative to shank 12. The first thread is then cut to the proper depth. Following this operation, screw 20 is loosened and element 28 is displaced parallel to keyways 30 and 40 by a distance equal to the pitch of the thread to be cut. The displacement of element 28 is indicated by the graduations on dial cylinder 44. Clamping screw 20 is again tightened and a second thread cut. The above process is repeated until all threads have been cut. If double threads are to be cut, only a single adjustment is required. If a triple thread is to be cut, two adjustments are required, etc. It should be noted however, that no adjustment is required in the gearing of the lathe or of the position of the work in the lathe. For this reason, the disadvantages inherent in previous methods of cutting multiple threads are not encountered when the tool holder described above is employed. Thus, semi-skilled workmen may be employed to machine multiple threads, a task previously performed by skilled machinists. Also, the time required to make the above described adjustments in the tool holder is generally less than the time required to readjust the lathe, hence applicant's device will increase the productivity of skilled as well as semi-skilled workmen.

An alternative method may be employed to adjust the position of element 28. Gauge blocks may be inserted between plates 46 and 48 and element 28, and screw 60 rotated to bring element 28 firmly against the gauge blocks. Screw 20 is then tightened in the usual manner. After the first thread is cut, the gauge blocks are removed and replaced by gauge blocks differing in dimension from the first-mentioned blocks by an amount precisely equal to the pitch of the thread.

The gauge blocks employed may be either standard gauge blocks or a set of special gauge blocks for each pitch thread to be cut may be provided. In either case, this alternative method provides a more accurate and generally quicker method of positioning element 28. However, it will be found that the method first described, that is, positioning element 28 by means of the graduations on dial 44 produces results well within usual machining tolerances.

It should also be noted that the tool holder described above is not limited in its use to multiple thread cutting. Quite to the contrary, this tool holder will be found useful in all applications where a series of cuts are to be made and which are to be spaced from each other by a precise amount.

Therefore, while there has been described what is at present considered the preferred embodiment of the invention, it is intended that the scope of the invention be limited solely by the appended claims.

The invention described herein may be manufactured and used by or for the Government of the United States of America for Government purposes without the payment of any royalty thereon or therefor.

What is claimed is:

1. A tool holder comprising a tool holding element formed with two flat, substantially parallel faces on opposite sides thereof, a bifurcated shank, each bifurcation of said shank being formed with a substantially flat face disposed in slidable contact with one of said faces on said tool holding element, each face of said tool holding element being formed with guide means thereon extending into engagement with a guide means formed on the corresponding face on said shank, said guide means limiting the movement of said tool holding element to a direction substantially at right angles to said shank, said tool holding element being formed with a tool receiving recess therein extending at right angles to said guide means and parallel to said faces on said tool holding element, screw means for moving said tool holding element relative to said shank, means indicating the relative position of said tool holding element and said shank, and means for varying the spacing between said faces on said shank whereby said tool holding element may be clamped therebetween.

2. A tool holder comprising a substantially rectangular tool holding element, first and second substantially parallel supporting means disposed in slidable engagement with opposite sides of said tool holding element, guide means formed on said sides of said tool holding element in engagement with said supporting means and on each of said supporting means, said guide means permitting relative movement between said supporting means and said tool holding element in one direction only, said tool holding element being formed with a tool receiving opening therein extending substantially perpendicular to said direction of motion, means associated with said tool holding element and said supporting means for adjusting the relative position therebetween along said direction of movement, means adapted to vary the spacing between said first and second supporting means whereby said tool supporting element may be clamped in position, and a shank secured to said first and second supporting means, said shank being formed to fit in the tool post of a lathe.

3. A tool holder as claimed in claim 2 wherein said means for adjusting the relative position of said tool holding element and said first and second supporting means along said line of movement comprises, first and second coplanar plates, said first plate having a first edge in close juxtaposition with a first edge of the said second plate when said tool holding element is clamped between said supporting means, said first plate being secured to said first supporting means, said second plate being secured to said second supporting means, said plates being disposed substantially perpendicular to the direction of motion of said tool holding element, said first and second plates each being formed with a semicircular opening therein, said openings having a substantially common center and a diameter parallel to said juxtaposed edges, a cylindrical member having a circumferential groove formed therein disposed within said semicircular openings in said first and second plates, at least one pin member having the ends thereof secured to one of said plates and an intermediate section thereof in engagement with said circumferential groove whereby said cylindrical member is restrained from axial movement relative to said first and second plates, a screw member secured to said cylindrical member at a first end and threadably engaging said tool holding element at a second end thereof whereby rotation of said cylindrical member results in relative movement of said tool holding element and said supporting means.

4. A tool holder as in claim 3 wherein said cylindrical member is formed with an opening therein to receive means for rotating said cylindrical member and said screw member and wherein said cylindrical member is calibrated to indicate the relative angular position of said screw member with respect to a reference position.

5. A tool holder comprising a substantially rectangular tool holding element having first and second substantially parallel faces on opposite sides thereof, a bifurcated shank, at least one of said bifurcations being adapted for resilient movement toward the other of said bifurcations, each bifurcation of said shank being formed with a substantially flat face disposed in slidable contact with one of said faces on said tool holding element, each face of said tool holding element being formed with guide means thereon extending into engagement with a guide means formed on the corresponding face of said shank, said guide means limiting the movement of said tool holding element to a direction susbtantially at right angles to said shank, said tool holding element being formed with a tool receiving recesss therein extending at right angles to said guide means and substantially parallel to said faces on said tool holding element, screw means for moving said tool holding element relative to said shank, means indicating the relative position of said tool holding element and said shank, and clamping means for moving one of said bifurcations toward the other of said bifurcations thereby to clamp said tool holding element between said faces on said bifurcations.

6. A lathe tool holder comprising a shank adapted to be clamped in the tool post of a lathe, a tool supporting element having a tool holding recess formed therein, means for restricting relative movement between said tool supporting element and said shank to a direction approximately perpendicular to said shank, means for micrometrically adjusting said tool supporting element relative to said shank along said direction of motion, said tool supporting element and said shank being formed with opposed parallel faces disposed at right angles to said direction of movement, said tool supporting element and said shank being adapted to receive gauge blocks between said opposed parallel faces for accurately positioning said tool supporting element relative to said shank and means for clamping said tool supporting element to said shank.

7. A tool holder comprising a tool holding element formed with a tool receiving recess, first and second support means disposed in slidable engagement with opposite sides of said tool holding element and adapted to be moved into clamping engagement with said tool holding element, means for moving said first and second support means into clamping engagement with said tool holding element, a shank secured to said first and second support means, guide means permitting relative movement between said tool holding element and said support means in a single direction only, and means associated with said tool holding element and said support means for adjusting the relative position therebetween along said direction of movement, said last-mentioned means comprising first and second coplanar plates, said first plate having a first edge in close juxtaposition with a first edge of said second plate when said support means are in clamping engagement with said tool holding element, said first and second plates being disposed substantially perpendicular to the direction of motion of said tool holding element and secured respectively to said first and second supporting means, said first and second plates each being formed with a semicircular opening therein, said openings having a substantially common center and a diameter parallel to said juxtaposed edges, a cylindrical member having a circumferential groove formed therein disposed within said semicircular openings in said first and second plates, at least one pin member having the ends thereof secured to one of said plates and an intermediate section thereof in engagement with said circumferential groove whereby said cylindrical member is restrained from axial movement relative to said first and second plates, a screw member secured to said cylindrical member at a first end and threadably engaging said tool holding element at a second end thereof whereby rotation of said cylindrical member results in relative movement of said tool holding element and said supporting means.

JOHN F. GOLDEN.

REFERENCES CITED

The following references are of record in the file of this patent:

UNITED STATES PATENTS

| Number | Name | Date |
|---|---|---|
| 1,502,712 | Chard | July 29, 1924 |
| 2,402,650 | Maffia | June 25, 1946 |
| 2,456,140 | Mueller et al. | Dec. 14, 1948 |
| 2,465,757 | Schlesinger | Mar. 29, 1949 |